Figure 1:
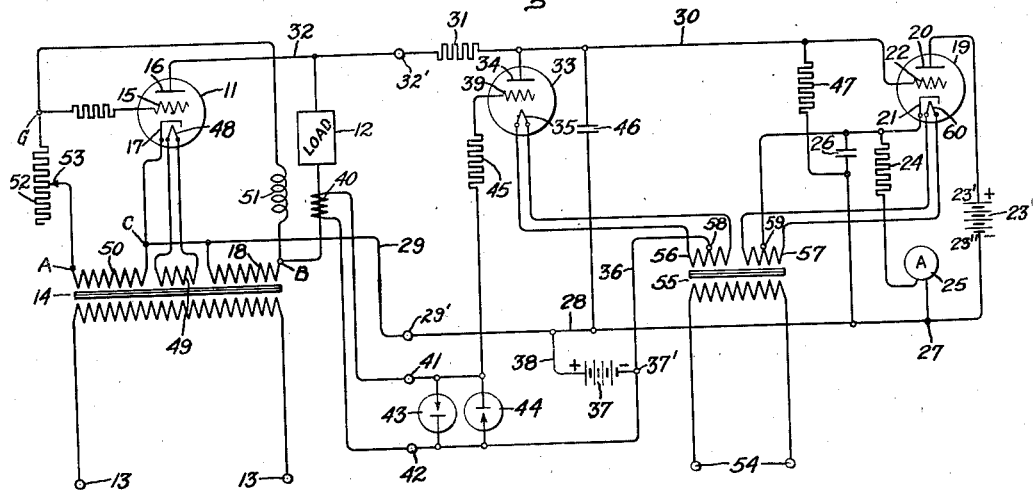

Aug. 6, 1935.  H. W. LORD  2,010,697

PEAK VOLTAGE MEASURING DEVICE

Filed May 31, 1933

Inventor:
Harold W. Lord,
by Harry E. Dunham
His Attorney.

Patented Aug. 6, 1935

2,010,697

UNITED STATES PATENT OFFICE 2,010,697

PEAK VOLTAGE MEASURING DEVICE

Harold W. Lord, Schenectady, N. Y., assignor to General Electric Company, a corporation of New York Application May 31, 1933, Serial No. 673,611

11 Claims. (Cl. 175—183)

My invention relates to electric measuring and testing devices and concerns particularly methods and arrangements for measuring peak voltages during certain portions of the operating cycle of electrical apparatus.

It is an object of my invention to provide an apparatus which shall be responsive to the voltage acting in an electrical apparatus or a certain portion of the apparatus while the apparatus is carrying a load, but which shall be unresponsive to the voltage in the apparatus while no load is being carried although the voltages existing during no load may be considerably greater than the voltages desired to be measured.

It is another object of my invention to measure the maximum value of the potential drop in the rectifying element of apparatus for converting alternating current to direct current or vice versa during the current-conducting period, but which shall be unresponsive to the inverse voltage or the forward voltage while no direct current is flowing.

It is still another object of my invention to provide an apparatus for measuring the maximum voltage across the arc of a gaseous or vapor discharge tube type of rectifier or inverter.

It is also an object of my invention to provide a method for testing arc discharge tubes.

Other and further objects and advantages will become apparent as the description proceeds.

In connection with the operation of vapor discharge tubes used for rectifying or in inverters, I have found it desirable to determine the peak value of the drop in voltage across the electrodes during the existence of the arc. The value of this voltage furnishes a good indication of the state of the tube and the character of its operation. Increasing values of the arc drop serve to indicate decreasing efficiency or improper operating conditions of the tube. However, the potential difference between the power electrodes of a discharge tube during the inverse or negative portion of the voltage wave, as well as during that portion of the forward or positive portion of the voltage wave before the tube breaks down, is obviously considerably higher than the peak voltage across the arc. Consequently, a simple peak voltmeter would be of no value since it would measure either the maximum inverse or the maximum forward voltage and not the maximum value of the voltage desired. It is, therefore, an object of my invention to provide apparatus which shall be unresponsive to the voltages occurring during any portion of the cycle when useful direct current is not flowing through the output circuit of the tube. There are other applications in which it may be desirable to measure average or peak voltages during a certain portion of the duty cycle of an electrical apparatus without reference to voltages which may exist during other portions of the duty cycle, and my invention may also obviously be used in connection with such applications.

In accordance with my invention in its preferred form I employ a peak voltmeter which has its terminals connected to the two points between which a voltage measurement is desired. The peak voltmeter preferably takes the form of a vacuum tube voltmeter, although my invention obviously is not limited to any particular type of peak voltage responsive unit. A resistor having a relatively high resistance is connected in series with one of the leads of the peak voltmeter, and means are provided for short-circuiting the peak voltmeter during the portions of the operating cycle or duty cycle of the apparatus when voltages exist in the apparatus which it is not desired to measure. This is preferably accomplished by means of a grid-controlled discharge tube having its electrodes connected in parallel with the terminals of the peak voltmeter and having its control grid so connected to the secondary winding of a current transformer having its primary in series with the load that the grid becomes negative and the tube becomes non-conducting while current is flowing through the load, but the tube remains conducting while no current is flowing through the load. In this manner the voltage in the apparatus is applied to the peak voltmeter only during the desired portions of the operating cycle of the apparatus.

The features of my invention which I believe to be novel and patentable are pointed out in the claims appended hereto.

Figure 2:
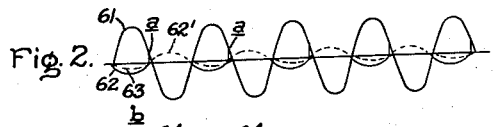
Figure 3:
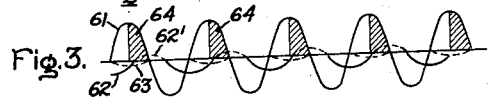
Figure 4:
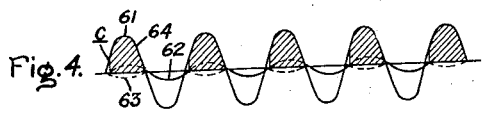
Figure 5:
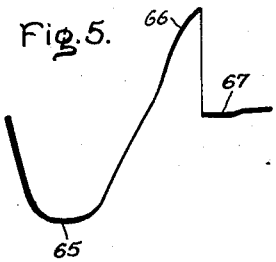
Figure 6:
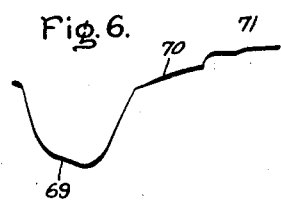
Figure 7:
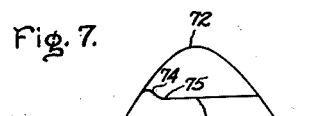
Figure 8:
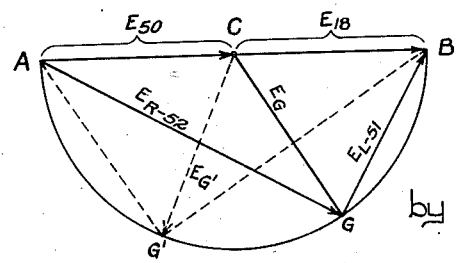

A better understanding of my invention itself, however, may be obtained by referring to the following description in connection with the accompanying drawing, in which Fig. 1 is a schematic circuit diagram illustrating the use of my invention with a rectifying vapor discharge tube of the grid-controlled type; Figs. 2, 3, and 4 are curves illustrating the operating characteristic of grid-controlled vapor rectifiers; Fig. 5 is a voltage curve taken from an oscillogram illustrating the operation of a grid-controlled vapor rectifier under certain conditions; Fig. 6 is a copy of an oscillogram indicating the voltages acting in a peak voltmeter used with a grid-controlled vapor arc rectifier in accordance with my invention; Fig. 7 is a curve representing a characteristic of a two-element vapor arc rectifier; and Fig. 8 is a circle diagram explaining a method of controlling the phase of the grid of a grid-controlled rectifier.

Referring now in more detail to the drawing, I have illustrated the use of my invention in measuring the arc drop in a vapor arc rectifier 11, but it will be understood that my invention is not limited to use with arc discharge tubes utilized in rectifiers and inverters.

The arc discharge tube 11 is shown as supplying a direct current to a load 12 of any suitable type, which may consist, for example, of a direct-current railway system, an electrolytic plant or any other application where direct current may suitably be supplied by means of a vapor arc rectifier. The tube 11 is energized by means of a suitable source of alternating current 13 through a transformer 14. The tube 11 is provided with a control grid 15, an anode 16 and a cathode 17. The electrodes 16 and 17 are connected in series with the load 12 and a secondary winding 18 of the transformer 14. To avoid complicating the drawing, I have illustrated the invention in connection with apparatus employing only a single tube and single-phase power supply but it will be understood that the tubes in full wave rectifiers and inverters or associated with polyphase circuits may also be tested by means of my invention.

The peak voltmeter comprises a discharge tube 19, preferably a vacuum discharge tube, having an anode 20, a cathode 21, which may if desired be indirectly heated, and a control grid 22. Electrodes 20 and 21 are connected in series with a source of direct current 23, a resistor 24 having a relatively high resistance, and a current-responsive instrument 25 which may take the form of an indicating instrument, of a recording instrument or of a contact-making instrument, as desired. A condenser 26 is connected between the cathode 21 and the common terminal 27 of the voltage source 23 and the current-responsive device 25. For reasons which will be explained hereinafter the potential difference between the plates of condenser 26 varies substantially linearly with the voltage which my apparatus is designed to determine. The high resistance resistor 24 and the current-responsive device 25 permit determining the voltage of condenser 26 without substantially varying its charge, but it will be understood that any other means responsive to the voltage of condenser 26 may also be employed.

The terminal 27 of the current-responsive device 25 is connected to the cathode 17 of the arc discharge tube 11 by means of conductors 28 and 29, and the control grid 22 of the voltmeter tube 19 is connected to the anode 16 of the arc discharge tube 11 through conductor 30, resistor 31 having a relatively high resistance, and conductor 32, thereby making the potential of the grid 22 of the voltmeter tube 19 responsive to the potential difference between the electrodes 16 and 17 of the arc discharge tube 11.

To prevent impressing on the grid 22 voltages which would exceed the peak value of the arc drop in the tube 11, a discharge tube 33 is provided having an anode 34 connected to the control grid of the voltmeter tube 19 through conductor 30, and a cathode 35 connected to the terminal 27 of current-responsive device 25, through conductor 36, a grid biasing battery 37, conductor 38 and conductor 28. Although I prefer to employ the grid-biasing battery 37 it will be understood that its use is not essential if the tube 19 is of a type which tends to pass appreciable current only with a positive grid bias.

The discharge tube 33 is also provided with a control grid 39 which is connected to the secondary winding of a current transformer 40 having its primary winding connected in series with the anode 16 of tube 11. In half-wave rectifiers energized by single-phase alternating current the primary winding of current transformer 40 is, of course, also in series with load 12, but it will be understood that if more than one arc discharge tube is employed or a tube with more than one anode, the primary winding of current transformer 40 is to be connected in the individual anode circuit in which the arc drop is to be measured. The terminals 41 and 42 of the secondary winding of the current transformer 40 are shunted by a suitable device such as the oppositely connected glow tubes 43 and 44 to prevent the secondary voltage of the current transformer 40 exceeding a predetermined value regardless of the magnitude of the current flowing through the load 12. Preferably, a resistor 45 having a relatively high resistance is inserted between the terminal 41 of the secondary winding of the current transformer 40 and the control grid 39 of the discharge tube 33. The discharge tube 33 is preferably of the low impedance type, that is, one which remains conducting unless the grid bias is negative, for reasons which will be explained hereafter. It will be understood, however, that my invention may be carried out without using a low impedance tube, in which case, a higher value of resistance in the resistor 31 would be desirable than when a low impedance tube is used.

Although I have shown the glow tubes 43 and 44 separately, it will be understood that a single device having a double set of electrodes to permit breakdown in either direction may also be employed, or under certain circumstances I may employ a single glow tube with a different breakdown voltage in one direction than in another.

The glow tubes 43 and 44 are of the type well known in the art and serve to limit the secondary voltage of the current transformer 40 by breaking down when the voltage approaches a predetermined value and drawing a variable current so as to maintain constant secondary voltage, as the primary current and the burden of the transformer vary with the variations in the current in the load 12.

A condenser 46 is preferably connected between the grid 22 of the voltmeter tube 19 and the terminal 27 of the current-responsive device 25, to prevent any slight surge from the breakdown of glow tubes 43 and 44 from affecting the response of the voltmeter tube 19. The constants are so chosen that the condenser 46 with resistor 31 will have such a short time constant as to have a negligible effect on the voltage applied to the voltmeter tube. A discharge resistor 47 of a relatively high resistance serves to prevent the accumulation of a charge on the condenser 46, when the voltmeter is not in use and the terminals 32' and 29' are not connected to the power circuit.

The arc discharge tube 11, shown in Fig. 1 by way of illustration, may for example be of the type having its cathode 17 indirectly heated by means of a filament 48 energized by a secondary winding 49 of the transformer 14. As is well known, when employing arc discharge tubes of the grid-controlled type, the magnitude of the direct current may be controlled by controlling the phase of the voltage impressed upon the grid 15 with respect to the phase of the voltage impressed upon the anode 16. For the sake of illustration I have shown one arrangement for accomplishing this result which comprises an inductor 51 connected between the load terminal B of the secondary winding 18 of the transformer 14 and the control grid 15, and a variable resistor 52 connected between the control grid 15 and one end A of a secondary winding 50 of the transformer 14, having its other end connected to the cathode 17 of the arc discharge tube 11 and to the cathode terminal C of the secondary winding 18. A movable contact 53 serves to permit variation of the resistance of the resistor 52. The operation of the phase-controlling device for grid 15 will be explained hereafter.

Discharge tubes 33 and 19 are preferably of the hot-cathode type and may have their cathodes heated by energy supplied by a source of alternating current 54 through a transformer 55 having a secondary winding 56 connected to the cathode 35 of discharge tube 33, shown as a filamentary cathode, and a secondary winding 57 connected to the filament 60 serving to heat indirectly the cathode 21 of the voltmeter tube 19. The secondary windings 56 and 57 are preferably provided with taps 58 and 59 respectively at their midpoints to serve as cathode connections. Although I prefer to employ an indirectly heated cathode in tube 19 if alternating current is used as the heating source, it will be understood that the tubes 19 and 33 may be of either the filamentary cathode or of the indirectly heated cathode types.

Arc discharge tubes of the grid-controlled type operate on the principle that the tube is conducting only when the anode is positive and the control grid is positive, or is only very slightly negative, depending upon the design of the tube. In Fig. 2, the curve 61 represents the potential of the anode 16 of the arc discharge tube 11, and the curve 62 represents the potential of the grid 15, the positive portion 62' of the grid potential curve 62 being shown dashed. In the particular design of tube illustrated by way of example, the tube becomes conducting whenever the anode potential is positive and the grid potential is more positive than certain values indicated by the dashed curve 63. If the grid potential 62 remains more negative than the curve 63 throughout the positive half cycles of the anode potential curve 61, the tube remains non-conducting. In the condition shown in Fig. 2, however, the grid potential curve 62 crosses the curve 63 at a point $a$ in each cycle, and the tube 11 becomes conducting at the point $a$ in each cycle and remains conducting for the remainder of the half cycle. In the condition shown in Fig. 3, the phase relationship of the grid potential curve 62 has been advanced so that the curve 62 crosses the curve 63 at the point $b$, and the tube 11 is conducting during the shaded portions 64 of the positive half cycles. In the condition shown in Fig. 4, the phase of the grid has been further advanced so that the tube 11 conducts during almost the entire positive half cycles.

Any suitable means may be employed for varying the phase relationship of the grid 15. In the arrangement illustrated in Fig. 1, the grid 15 is connected at the common terminal of inductance 51 and rheostat 52. Owing to the inductance of the element 51 the current in the circuit 51—52, and consequently the voltage drop in the resistor 52, tends to lag behind the voltage supplied by the secondary winding 18 some amount between zero and 90° depending upon the ratio of resistance to inductance in circuit 51—52. The voltage drop in inductor 51 leads that in resistor 52 by substantially 90° so that the voltage drop in inductor 51 leads the voltage supplied by the secondary winding 18 by an amount between 90° and zero degrees depending on the resistance-inductance ratio.

The phase relationship between the voltages is illustrated graphically in the circle diagram, Fig. 8, where $E_{R-52}$ represents the difference in potential between the connection G to grid 15 and the terminal A of winding 50, $E_{L-51}$ represents the difference in potential between the load terminal B of the winding 18 and grid connection G to grid 15, $E_{18}$ represents the voltage of winding 18, and $E_{50}$ the voltage of winding 50. The vector sum of $E_{R-52}$ and $E_{L-51}$ is necessarily equal to AB, the voltage produced by windings 50 and 18 in series. The locus of the point G, representing the potential of the grid, is a circle, and the phase relationship between $E_{18}$, the voltage supplied to the anode, and $E_G$, the potential difference between the grid connection G and cathode connection C, obviously depends upon the ratio of resistance to inductance in circuit 51—52. By changing the setting of the tap 53 of the rheostat 52, the ratio of resistance to inductance in the circuit 51—52 may be varied, and consequently the phase relationship of the anode and grid voltages may be varied at will. For example, if the ratio of resistance to inductance is decreased, the grid potential may be retarded to the point G' to give a grid voltage of $E_G'$.

Fig. 5 is an oscillogram representing the voltage between the anode and cathode of a grid-controlled arc discharge tube, with the grid phase relationship adjusted to cause an arc to be struck just before the middle of the positive half cycle of the anode voltage, that is, with a slightly longer conducting period than the condition illustrated in the curve of Fig. 3. The portion 65 of the curve in Fig. 5 represents the inverse voltage between the electrodes of the arc discharge tube. The portion 66 of the curve represents the forward voltage or the voltage during the positive portion of the half cycle before the tube has become conducting. The portion 67 of the curve represents the voltage between the electrodes after the tube has become conducting, or the arc drop in the tube, which is the voltage which it is desired to measure in certain tests on arc discharge tubes.

It will be seen that the voltage indicated in the portion 67 of the curve is of a much lower order of magnitude than the voltages in the portions 65 and 66. Consequently, a voltage-responsive device having a range well adapted to measure accurately, the voltage in the portion 67 would be overloaded and badly damaged if subjected to the voltages existing in the portions 65 and 66 of the curve. Furthermore, an indication of the average value or of the R. M. S. value of voltage during the entire cycle would be wholly valueless as an indication of the value of the arc voltage 67, since the inverse voltage 65 and the forward voltage 66 are so much greater in magnitude and bear no fixed relation to the desired value.

The curve shown in Fig. 6 is an oscillogram representing the voltage between the grid 22 of the voltmeter tube 19 and the terminal 27 of the current-responsive device 25 when my device is used to measure the peak value of the arc drop in an arc discharge tube, adjusted to give the condition shown in Fig. 5. It will be seen that in the portion 69 of the curve of Fig. 6 corresponding to the inverse voltage 65 of Fig. 5 and in the portion 70 in the curve of Fig. 6 corresponding to the forward voltage 66 of Fig. 5, the grid potential is negative and the voltmeter tube 19 remains non-conducting. During the portion 71, however, of the curve shown in Fig. 6 which corresponds to the arc drop of Fig. 5, the grid 22 of the voltmeter tube 19 is positive and the voltmeter tube becomes operative to provide an indication of the arc voltage.

If the voltmeter tube 19 is arranged to measure instantaneously in a manner which is well understood in the art, the portion 71 of the curve of Fig. 6 may be reproduced, or with a suitable current-responsive instrument in the plate circuit of the voltmeter tube 19 the average value of the arc drop may be measured. In the form of my invention illustrated in Fig. 1, however, the voltmeter tube 19 has been arranged to measure the peak value of the arc drop. This operation results from the fact that the condsenser 26 is connected in shunt to the resistor 24 and the current-responsive instrument 25. The reason the current-responsive instrument 25 indicates the peak value of the arc drop will become apparent from a consideration of the operation of the apparatus.

It will be assumed that the grid voltage of the arc discharge tube 11 has been so adjusted in phase as to give a condition similar to that, for example, shown in Fig. 5. While the anode voltage of the arc discharge tube 11 is negative the grid potential of the control grid 22 of the voltmeter tube 19, which is connected to the anode 16, will obviously also be negative as shown in the portion 69 of curve 6. When the anode potential of the arc discharge tube 11 becomes positive, as shown at 66 in curve 5, the potential of the control grid 22 of voltmeter tube 19 would ordinarily tend to become positive likewise. However, as yet no current is flowing through the anode circuit of tube 11, and the current transformer 40, likewise the control grid 39 of the low-impedance discharge tube 33, is unaffected. Consequently, the discharge tube 33, being designed as a low-impedance tube, is conducting and serves to connect the negative terminal 37' of the grid bias battery 37 to the control grid 22 of the voltmeter tube 19. As shown by the portion 70 in curve 6, the control grid 22 is maintained negative and the operation of the voltmeter tube 19 is prevented. Owing to the magnitude of the resistance of the resistor 31, this operation may take place in spite of the fact that the anode 16 of the arc discharge tube 11 is positive.

When the arc discharge tube 11 breaks down, however, as indicated by the discontinuity between portions 66 and 67 of the curve of Fig. 5, current flows in its anode circuit and in the primary of the current transformer 40 as a result of the arc taking place between the cathode 17 and the anode 16 of the tube 11. The flow of current in the primary winding of the current transformer 40 results in a voltage between the terminals 41 and 42 of the current transformer 40, which is so connected that the grid 39 of the low-impedance discharge tube 33 becomes negative with respect to the cathode 35 of the discharge tube 33. Consequently, the discharge tube 33 becomes non-conducting and the potential of the control grid 22 of the voltmeter tube 19 is permitted to follow the potential of the anode 16 of the arc discharge tube 11.

Owing to the fact that the control grid 22 of the tube 19 does not draw any current, the resistor 31 does not interfere with the equality of potential between anode 16 and control grid 22. The potential of the control grid 22 of the voltmeter tube 19 during the maintenance of the arc in tube 11 is shown at 71 in Fig. 6. If the condenser 26 were omitted, the plate current in the voltmeter tube 19 would obviously vary with the grid voltage of the voltmeter tube 19, and the current-responsive device 25 connected in the plate circuit could be calibrated to indicate the arc drop.

However, in connection with arc discharge tubes I have found that the quantity which is of greatest value to the operator or tester is the peak value of the arc voltage. This value tends to increase as a tube becomes less efficient with age or if for any reason the tube becomes defective. The peak value of the arc drop provides a better indication of the condition of the tube than the average arc drop during the conducting period, since a defect causing a peak of short duration will affect only slightly the average during the conducting period. As already explained, the average potential difference between anode and cathode during the entire cycle would be wholly valueless. Where several arc discharge tubes are used in parallel or in combination, my method of testing is also of great value. By detecting defective operation of one of the tubes, overloading of the other tubes, which might not otherwise be apparent, may be prevented.

The current-responsive device 25 may be made responsive to the peak value of the arc drop by connecting the condenser 26, as shown. It is obvious that while the arc is maintained and the grid 22 of the voltmeter tube 19 is positive, as shown at 71 in Fig. 6, the voltmeter tube 19 will conduct current. Consequently, a path will be provided from the positive terminal 23' of the voltage source 23 to the cathode side of the condenser 26, which has its opposite plate already connected to the negative terminal 23" of the voltage source 23. Consequently, the charge stored in the condenser 26 will tend to rise as long as the tube 19 is conducting. Owing to the increasing charge on the condenser 26, the potential of the cathode 21 of the tube 19 will rise until it has reached such a potential that the tube 19 shuts off. The tube 19 becomes non-conducting when its cathode 21 becomes equal in potential to its grid 22, or slightly more positive by a fixed amount than grid 22, depending upon the characteristics of the tube 19 selected. The voltage attained by condenser 26, therefore, bears a linear relationship to the maximum potential of the control grid 22, which corresponds to the peak value of the arc drop of discharge tube 11. Consequently, the magnitude of the charge stored in condenser 26 provides an indication of the peak value of the arc drop. The resistor 24 has a very high resistance, so that the discharge of condenser 26 which tends to take place through resistor 24 and current-responsive device 25 is very gradual and is substantially without effect upon the magnitude of the charge stored in condenser 26. The current-responsive device 25 is chosen to be sufficiently sensitive to indicate the magnitude of the discharge current, which obviously is proportional to the charge stored in condenser 26 and the potential difference between its terminals produced by the charge. The current-responsive device 25 therefore responds to the peak value of the arc drop in tube 11. The condenser 26 obviously continues to discharge during the portions of the cycle when the control grid of voltmeter tube 19 is negative, as shown at 69 and 70 of Fig. 6, but as already stated the magnitude of the resistance of resistor 24 is so chosen that the rate of discharge is slow enough to maintain a charge in condenser 26 which is proportional to the peak value of the arc drop.

I have explained the operation of my invention in connection with an arc discharge tube of the grid-controlled type, but it will be understood that my invention is not limited thereto. For example, in connection with vapor or gaseous discharge tubes of the two-electrode type, or the type not employing a control grid, it is also desirable to be able to measure the peak value of the arc drop or the peak value of the voltage between the electrodes during the period when current is flowing. For example, in Fig. 7, the sine curve 72 represents the voltage which is applied to a rectifier of the arc discharge type by a source of alternating current. The curve 73 represents the voltage between the electrodes of the rectifying tube. It is a characteristic of such tubes that the arc does not commence immediately after the voltage becomes positive; instead, the voltage between the electrodes rises during an initial portion of the half cycle to a peak value shown at 74, and the discharge does not take place until an instant later, shown at 75. In order to measure the maximum value of the arc drop it is therefore necessary to employ a device which will be unresponsive to the peak 74 and will not become responsive until the point 75 at which the arc commences. The device which I have invented is therefore of considerable value also in connection with two-electrode arc discharge tubes.

In accordance with the provisions of the patent statutes I have described the principle of operation of my invention together with the apparatus which I now consider the best embodiment thereof, but I desire to have it understood that the apparatus shown and described is only illustrative and that the invention may be carried out by other arrangements.

What I claim as new and desire to secure by Letters Patent of the United States is:

1. A device responsive only to the peak value of the drop in voltage across the arc of an electric discharge element having electrodes between which current is carried by an arc, comprising a peak voltage-responsive unit having terminals connected to the electrodes of said discharge element, and means for making said peak voltage-responsive unit unresponsive to the voltage between said electrodes during the period that the arc in said discharge element is extinguished.

2. Apparatus responsive only to the peak value of voltage drop in an electrical appliance during the period of time that power is being transmitted, comprising a peak voltage-responsive device connected to said appliance, and means for making said peak voltage-responsive device unresponsive to the voltage in said appliance during the period of time that no power is being transmitted.

3. An electrical measuring and testing device comprising a grid-controlled electric discharge tube having an anode, a cathode and a control grid, a source of current and a current-responsive device connected in series between said anode and said cathode, said cathode and said control grid being connected to an electrical circuit in which a measurement is to be made, thereby tending to cause the grid potential, the conductivity of said tube and the operation of said current-responsive device to depend upon the electrical condition of said electric circuit, means limiting the flow of current to said control grid, a second grid-controlled discharge tube having a control grid, an anode connected to the control grid of said first-mentioned discharge tube and a cathode connected to the cathode of the first-mentioned discharge tube, thereby normally providing a low impedance path between the grid and cathode of said first-mentioned discharge tube and suspending its operation, means for maintaining the control grid of said second tube negative with respect to its cathode while power is flowing in the circuit in which a measurement is to be made, thereby making the impedance of said second tube relatively high and permitting the operation of said first tube, so that the operation of said current-responsive device is controlled only by the electrical condition of said measured circuit while the circuit is under load.

4. Apparatus for measuring the forward arc drop in a vapor discharge device comprising a voltmeter of the discharge tube type having terminals connected to said vapor discharge device, a relatively high resistance connected in the leads between said voltmeter and said discharge device, and means for substantially short circuiting said voltmeter except while said discharge device is conducting current, thereby making said voltmeter unresponsive to back voltages and to open circuit forward voltages.

5. An arrangement responsive only to voltages existing in electrical apparatus while said apparatus is under load, comprising a voltage-responsive device having terminals connected to said electrical apparatus and means for making said voltage-responsive device unresponsive while said electrical apparatus is not under load, said latter means comprising means tending to limit the flow of current to said voltage-responsive device, a discharge tube having an anode and a cathode connected across the terminals of said voltage-responsive device and having a control grid, a current transformer having a primary winding connected in series with said electrical apparatus and a secondary winding having terminals connected to the cathode and the control grid respectively of said discharge tube, said tube normally having a relatively low impedance, tending to short circuit said voltage-responsive device and make it non-responsive, said current transformer being so connected that the potential of the grid of said discharge tube becomes negative with respect to the cathode of said discharge tube when current flows in said electrical apparatus, whereby said voltage-responsive device is permitted to become responsive only to voltages acting during the period said electrical apparatus is loaded.

6. Apparatus responsive to the maximum arc drop in an arc discharge device comprising a peak voltage-responsive device connected to the electrodes of said arc discharge device, means tending to limit the flow of current to said voltage-responsive device, a three-element discharge tube having an anode and a cathode connected to said voltage-responsive device and having a control grid, a current transformer having a primary winding connected in series with the output circuit of said arc discharge device and a secondary winding having one terminal connected to the cathode of said discharge tube and a second terminal connected to the control grid of said discharge tube, thereby normally providing a relatively low impedance current path in shunt to said voltage-responsive device causing it to remain unresponsive, the connections of said transformer being such that the control grid of said discharge tube becomes negative with respect to the cathode while current is flowing in the output circuit of said rectifier, and said discharge tube becomes non-conducting and permits said voltage responsive device to become operative, whereby said peak voltage-responsive device is made responsive only to voltages existing while current is flowing in the output circuit and an arc exists in said arc discharge device.

7. An arrangement responsive to a peak voltage in an electrical apparatus existing during periods when said apparatus is under load comprising a discharge tube having an anode, a cathode and a control grid, a source of direct current having its positive side connected to the anode of said tube, a condenser connected between the negative side of said current source and the grid of said tube and means responsive to the voltage of said condenser, a second discharge tube having a control grid and having an anode connected to the control grid of said first-mentioned discharge tube and a cathode connected to the negative side of said condenser, said second tube normally providing a low impedance path and suspending the operation of said first-mentioned tube by maintaining its grid at a low potential, means limiting the flow of current to said first-mentioned discharge tube from said electrical apparatus, a current transformer having a primary winding connected in series with the output circuit of said electrical apparatus and a secondary winding having a terminal connected to the control grid of said second-mentioned discharge tube and another terminal connected to the cathode of said second-mentioned discharge tube, the connections of said current transformer being such that the potential of the control grid of said second-mentioned discharge tube becomes negative with respect to the cathode thereof while current is flowing in the output circuit of said electrical apparatus thereby making said second-mentioned discharge tube non-conducting while said electrical apparatus is under load, permitting the control grid of said first-mentioned discharge tube to assume the voltage of said electrical apparatus, thus permitting said first-mentioned discharge tube to become conducting and to charge said condenser until the voltage of the cathode of said first-mentioned discharge tube rises to a potential bearing a fixed relationship to that of the control grid and shuts off said first-mentioned discharge tube when said condenser has attained a voltage dependent upon the maximum voltage of said electrical apparatus under load.

8. An arrangement for permitting the operation of an electrical device only during the duration of load in an electrical apparatus with which said device is associated, which comprises an electric discharge tube having an anode and a cathode connected in circuit with the device to be controlled, and a control grid, a current transformer having a primary winding connected in series with said electrical apparatus and a secondary winding having a terminal connected to the control grid of said discharge tube and another terminal connected to the cathode of said discharge tube, said current transformer being so connected that the potential of said control grid is varied with respect to the potential of the cathode while said electrical apparatus is loaded for the purpose of varying the conductivity of said discharge tube, thereby permitting said electrical device to operate only during the period that said electrical apparatus is loaded.

9. In combination with an arc discharge tube having a pair of electrodes, a peak voltmeter connected to said electrodes and means for allowing said voltmeter to respond to the potential difference between said electrodes only while an arc exists therebetween.

10. A method of testing an arc-discharge tube in which an arc can exist only when the supply voltage has a given polarity, referred to as positive, which method comprises connecting a unidirectional voltage-measuring device between the electrodes of said tube to respond to positive voltages, preventing the interelectrode voltage from affecting said voltage-measuring device during the non-conducting portion of the positive half-cycle of the supply voltage, and measuring the maximum value of the voltage affecting said voltage-measuring device.

11. A method of testing an arc discharge tube which comprises connecting the voltage-measuring device to the electrodes of the tube, preventing the interelectrode voltage from affecting said device while the tube is non-conducting, and measuring the maximum value of the voltage affecting said voltage-measuring device.

HAROLD W. LORD.